(12) United States Patent
Hopkins et al.

(10) Patent No.: US 12,626,086 B1
(45) Date of Patent: *May 12, 2026

(54) HOUSINGS FOR TRACKING DEVICES

(71) Applicant: Elevation Lab, Inc., Portland, OR (US)

(72) Inventors: Casey Hopkins, Portland, OR (US); Jacob Hull, Portland, OR (US)

(73) Assignee: Elevation Lab, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/265,382

(22) Filed: Jul. 10, 2025

Related U.S. Application Data

(63) Continuation of application No. 19/012,635, filed on Jan. 7, 2025, now Pat. No. 12,393,817.

(51) Int. Cl.
G06K 19/077 (2006.01)

(52) U.S. Cl.
CPC .............................. G06K 19/07758 (2013.01)

(58) Field of Classification Search
CPC .................................................. G06K 19/07758
USPC .......................................................... 235/492
See application file for complete search history.

(56) References Cited

U.S. PATENT DOCUMENTS

| | | | |
|---|---|---|---|
| 2023/0046992 A1* | 2/2023 | Leyva ................... | H04L 67/535 |
| 2024/0211717 A1* | 6/2024 | Barovic ............. | G06K 19/0702 |
| 2024/0239144 A1* | 7/2024 | Trimnell ............ | G08B 21/0288 |
| 2024/0254809 A1* | 8/2024 | Wright ................. | F16M 13/04 |
| 2024/0384872 A1* | 11/2024 | Fraser ...................... | F23Q 2/38 |

* cited by examiner

*Primary Examiner* — Allyson N Trail
(74) *Attorney, Agent, or Firm* — Kolitch Romano Dascenzo Gates LLP

(57) ABSTRACT

Housings (10) for tracking devices (12) comprise a housing body (16) and an elongate retainer (58). The housing body (16) has an internal volume (18) configured to selectively receive and retain the tracking device (12). The elongate retainer (58) is rigid and extends from the housing body (16). The elongate retainer (58) and the housing body (16) collectively define a passage (60) configured to receive at least a portion of an article (14).

17 Claims, 8 Drawing Sheets

6/8

HOUSINGS FOR TRACKING DEVICES

RELATED APPLICATION

This application is a continuation of and claims priority to U.S. patent application Ser. No. 19/012,635, filed on Jan. 7, 2025 and entitled HOUSINGS FOR TRACKING DEVICES, the complete disclosure of which is incorporated herein by reference.

FIELD

The present disclosure relates to housings for tracking devices.

BACKGROUND

In recent years, wireless tracking devices have become popular amongst consumers. Typically, wireless tracking devices are small and require additional hardware to be physically mounted or coupled to an object that a user desires to track. Consumers often use wireless tracking devices for keys, sports equipment, pets, electronic equipment, etc. In some applications, keeping dirt, debris, and water away from the wireless tracking device is important, as is providing a housing for a tracking device that is rugged and withstands impacts. Examples of housings for tracking devices are disclosed in U.S. Pat. Nos. 11,694,058; 11,910,888; 11,931,643; 11,934,902; and 12,014,236, the disclosures of which are incorporated herein by reference.

SUMMARY

Housings for tracking devices comprise a housing body and an elongate retainer. The housing body has an internal volume that is configured to selectively receive and retain the tracking device. The elongate retainer is rigid and extends from the housing body. The elongate retainer and the housing body collectively define a passage that is configured to receive at least a portion of an article.

DESCRIPTION

Figure 1:
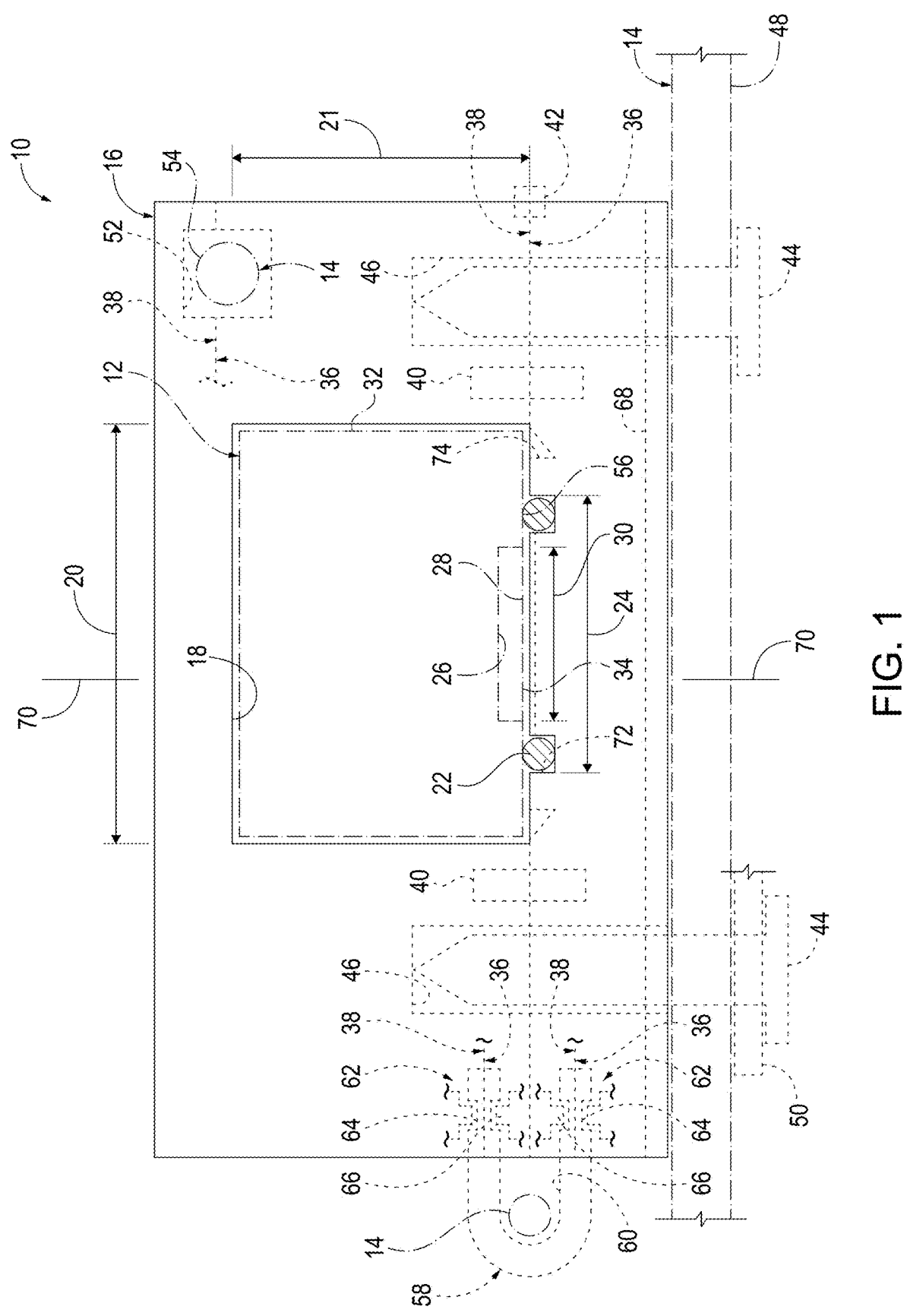
FIG. 1 is a schematic illustration representing housings for tracking devices according to the present disclosure.

Housings 10 for securing tracking devices 12 to articles 14 are disclosed herein. Examples of tracking devices 12 include wireless (e.g., WiFi, Bluetooth™, GPS) tracking devices (e.g., Apple AirTag™, Tile™, Samsung Galaxy SmartTag™, Chipolo One™, CubePro™, Orbit™, and Baseus™ branded tracking devices); and examples of articles 14 include sports equipment, snowboards, skis, skateboards, surfboards, paddle boards, stand-up paddle boards, wake boards, water skis, bicycles, hard-sided articles, land vehicles, trailers, All-Terrain-Vehicles (ATVs), motorcycles, watercraft, power tools, cases, luggage, camera gear, coolers, camping equipment, apparel, pet collars, etc. Functionally, a housing 10 may be used to secure a tracking device 12 to an article 14 that a user desires to keep track of.

FIG. 1 schematically illustrates housings 10 according to the present disclosure. Generally, in FIG. 1, elements that are likely to be included in a given example are illustrated in solid lines, while elements that are optional to a given example or that correspond to one or more specific examples are illustrated in broken lines. However, elements that are illustrated in solid lines are not essential to all examples of the present disclosure, and an element shown in solid lines may be omitted from a particular example without departing from the scope of the present disclosure.

As schematically represented in FIG. 1, housings 10 generally comprise at least a housing body 16 and a seal 22.

The housing body 16 has an internal volume 18 that is configured to selectively receive and retain the tracking device 12 in a close-fit relationship. For example, the size and shape of the internal volume 18 may be only slightly larger than (e.g., less than 1% by volume) the size and shape of the tracking device 12, such that the housing body 16 generally contacts a significant portion (e.g., greater than 50%) of the external surface of the tracking device 12 and restricts the tracking device 12 from moving relative to the housing body 16. As schematically indicated in FIG. 1, the internal volume 18 may be described as having a central axis 70, a width 20 (i.e., a maximum width) that is transverse to the central axis 70, and a height 21 (i.e., a maximum height) that is aligned with the central axis 70. In some examples the height 21 is less than the width 20. In some examples, the housing 10 is substantially radially symmetrical about the central axis 70. By "substantially radially symmetrical," it is meant that the housing 10 is at least 75% radially symmetrical, such as being at least 75% round.

The seal 22 is either positioned within the internal volume 18 or is configured to be positioned within the internal volume 18 (e.g., if sold or distributed in an unassembled state) to engage both the housing body 16 and the tracking device 12 when the tracking device 12 is operatively received in the internal volume 18. Accordingly, when the tracking device 12 is operatively received in the internal volume 18, the seal 22 effectively restricts fluids or debris from passing between the tracking device 12 and the housing body 16 at the location of the seal 22. As schematically indicated in FIG. 1, the seal 22 may be described as having an outermost (i.e., maximum) seal dimension 24 that is less than the width 20 of the internal volume 18.

In some examples, the seal 22 has an enclosed shape, such that when the tracking device 12 is operatively received in the internal volume 18, a region of the internal volume 18 is completely sealed off from the remainder of the internal volume 18. In other examples, the seal 22 defines an expanse, with an opening thereof, and is configured to engage an expanse of the tracking device 12.

As schematically represented in FIG. 1, in some examples, the housing body 16 defines a seal channel 72, within which the seal 22 is positioned or is configured to be positioned. In some such examples, the housing body 16 comprises one or more ribs 74 that at least partially define the seal channel 72.

In some examples, the seal 22 is an O-ring and/or a gasket. In some example, the seal 22 is fixed to the housing body 16. For example, the seal 22 may be adhered to the housing body 16 and/or may be overmolded to the housing body 16. In other examples, the seal 22 may be removable from the internal volume 18.

In some examples, the seal 22 is positioned within the internal volume 18 or is configured to be positioned within the internal volume 18 to protect less than an entirety of the tracking device 12 from environment that is external to the housing 10 when the tracking device 12 is operatively received in the internal volume 18. For example, depending on the configuration of the tracking device 12, portions of the tracking device 12 may be susceptible to damage when exposed to environment, such as a battery or electronics compartment that has the potential to be penetrated by moisture, while other portions of the tracking device 12 may be subject to moisture without issue. Such a configuration of housing 10 may provide for a more compact envelope, or overall volume, of the housing 10, thus utilizing less material for the construction of the housing 10 and for fitting into tighter spaces for securement of a tracking device 12 to an article 14.

As an example and as schematically represented in FIG. 1, in some examples, the tracking device 12 defines a battery compartment 26 and a device opening 28 to the battery compartment 26. In some such examples, the device opening 28 has an outermost opening dimension 30 that is less than the outermost seal dimension 24, and the seal 22 extends around the device opening 28 when the tracking device 12 is operatively received within the internal volume 18. Accordingly, the seal 22 protects the battery compartment 26 from moisture, but not necessarily others portions of the tracking device 12. In some such examples, the tracking device 12 comprises a device body 32 and a device cover 34 that is removably coupled to the device body 32 to close the device opening 28. The device body 32 defines the device opening 28, and the seal 22 engages the device body 32 around the device cover 34 when the tracking device 12 is operatively received within the internal volume 18. In some such examples, the seal 22 further engages the device cover 34 when the tracking device 12 is operatively received within the internal volume 18.

In some examples, the device body 32 comprises a circular planar surface 56 that extends around the device opening 28, and the seal 22 engages the circular planar surface 56 when the tracking device 12 is operatively received within the internal volume 18.

With continued reference to FIG. 1 in some examples of housings 10, the housing body 16 comprises a first body portion 36 and a second body portion 38 that collectively define the internal volume 18. In some such examples, the second body portion 38 is removably coupled to the first body portion 36 to permit placement and removal of the tracking device 12 in and from the internal volume 18. In such examples, the first body portion 36 and the second body portion 38 may be described as a base and a cover, respectively, or vice versa.

As schematically represented in FIG. 1, in some examples, the first body portion 36 and the second body portion 38 collectively define thread structure 40. In other words, relative rotation of the first body portion 36 relative to the second body portion 38 may effectively decouple and recouple the first body portion 36 and the second body portion 38. In some such examples, the thread structure 40 is configured to require less than 180-degrees of rotation, such as about 90-degrees of rotation, of the first body portion 36 relative to the second body portion 38 for operatively coupling and decoupling of the first body portion 36 and the second body portion 38. Such examples of thread structure 40 may be described as having a quarter-turn configuration.

In other examples, the first body portion 36 and the second body portion 38 have a snap-fit arrangement or a friction-fit arrangement.

In yet other examples as schematically illustrated in FIG. 1, the housing body 16 comprises a hinge 42, and second body portion 38 is hinged to the first body portion 36. In such examples, the first body portion 36 and the second body portion 38 also may have a snap-fit arrangement or a friction-fit arrangement to permit effective opening and closing of the housing body 16 about the hinge 42, and thus permit and restrict access to the internal volume 18 for placement and removal of the tracking device 12. Additionally or alternatively in hinged examples, housings 10 may further comprise a fastener 44 that selectively permits the opening and closing of the housing body 16 about the hinge 42.

In some examples of housings 10, the seal 22 engages only one of the first body portion 36 or the second body portion 38 when the first body portion 36 and the second body portion 38 are operatively coupled together. Stated differently, in such examples, the seal 22 is not positioned at an interface between the first body portion 36 and the second body portion 38.

As discussed above, housings 10 may be configured for being secured to various articles 14. As an example, the article 14 may be a flat flexible material 48, as schematically represented in FIG. 1. For example, the flat flexible material 48 may be a strap or webbing material, such as a pet collar, a backpack strap, or another type of strap. In such examples and as schematically illustrated in FIG. 1, housings 10 may further comprise at least one fastener 44 that is (e.g., two or more fasteners 44 that are) configured to extend through the flat flexible material 48, with the housing body 16 defining at least one fastener bore 46 that is (e.g., two or more fastener bores 46 that are) configured to operatively receive (i.e., mate with) the fastener(s) 44. In some such examples as schematically illustrated in FIG. 1, the fastener(s) 44 are configured to pierce the flat flexible material 48. That is, the fastener(s) 44 may have pointed or sharp ends and be configured to pierce between fibers, webbing, or the like. Accordingly, such housings 10 may be secured to a flat flexible material 48 without first needing to make a hole or holes in the flat flexible material 48.

Some housings 10 further comprise a backing plate 50 that is configured to be positioned opposite the housing body 16 relative to the flat flexible material 48, and the fastener(s) 44 are configured to extend through the backing plate 50. In some such examples of housings 10 with a housing body 16 that comprises a first body portion 36 and a second body portion 38, the fastener bore(s) 46 extend through the first body portion 36 and the second body portion 38. Accordingly, when the fastener(s) 44 extend through the flat flexible material 48 and are operatively received in the fastener bore(s) 46, the fastener(s) 44 serve to secure the housing 10 to the flat flexible material 48 and to couple the first body portion 36 to the second body portion 38 to restrict access to the internal volume 18. That is, in such examples, the fastener(s) 44 serve two functions: securing the housing 10 to the flat flexible material 48 and closing the housing body 16 to retain the tracking device 12 therein. Accordingly, separate fasteners need not be provided for these distinct functions, resulting in fewer parts and a smaller overall possible envelope, or volume, of the housing 10. Accordingly, such housings 10 may fit into tighter spaces for securing a tracking device 12 to an article 14.

With continued reference to FIG. 1, in some examples, the housing body 16 defines a through-hole 52 that is configured to receive at least a portion of an article 14. For example, the article 14 may be a key ring 54, a carabiner, or other such structure that is sized to extend through the through-hole 52. In some such examples in which the housing body 16 comprises a first body portion 36 and a second body portion 38, the through-hole 52 extends through both of the first body portion 36 and the second body portion 38. Accordingly, when the article 14, such as a key ring 54, operatively extends through the through-hole 52, the internal volume 18 is restricted from being fully accessed to receive the tracking device 12 in the internal volume 18 or to release the tracking device 12 from the internal volume 18. That is, the article 14 extending through the through-hole 52 may restrict the housing body 16 from being fully opened, thereby preventing the tracking device 12 from inadvertently being released from the housing 10, even if the coupling mechanism (e.g., threads, snap-fit arrangement, friction-fit arrangement, etc.) between the first body portion 36 and the second body portion 38 fails.

Additionally or alternatively, as also schematically illustrated in FIG. 1, some housings 10 further comprise an elongate retainer 58 that extends from the housing body 16. The elongate retainer 58 and the housing body 16 collectively define a passage 60 that is configured to receive at least a portion of an article 14, such as a key ring, a carabiner, a luggage handle, a belt loop, or other such structure. In some examples, the elongate retainer 58 is removably coupled to the housing body 16, thus permitting for the selective placement of a portion of an article through the passage 60. In other examples, the housing 10 may be configured to restrict opening of the passage 60, such that an article 14 has to be configured to selectively extend through the passage 60 for securement to the housing 10, such as with a key ring 54, a carabiner, or other structure that can be selectively opened by a user.

In some examples, the elongate retainer 58 is rigid, such as similar to a shackle on a padlock. In other examples, the elongate retainer 58 is flexible, such as being constructed of a braided metal wire or a plastic-coated braided metal wire.

With continued reference to FIG. 1, in some examples, the elongate retainer 58 comprises end regions 62 that are positioned within the housing body 16, and the housing body 16 is configured to restrict removal of the end regions 62 from within the housing body 16. In some such examples, each end region 62 defines a circumferential channel 64, and the housing body 16 comprises at least one protrusion 66 that extends into each circumferential channel 64. For example, the protrusion(s) 66 may be a rib that extends substantially around or even fully around the circumferential channel 64 of the end regions 62. In some such examples of housing 10 where the housing body 16 comprises a first body portion 36 and a second body portion 38, the first body portion 36 and the second body portion 38 collectively define the protrusion(s) 66 that extends into each circumferential channel 64. In other examples, only one of the first body portion 36 or the second body portion 38 may define the protrusion(s) 66. Accordingly, when the first body portion 36 and the second body portion 38 are operatively coupled together, the end regions 62 are restricted from being removed from the housing body 16, and when the first body portion 36 and the second body portion 38 are operatively separated, the end regions 62 are permitted to be removed from the housing body 16. Accordingly in such examples, when the housing body 16 is opened to permit access to the internal volume 18 for placement or removal of a tracking device 12, the end regions 62 may be removed from the housing body 16 for selective extension around a portion of an article 14 by a user.

As schematically illustrated in FIG. 1, some housings 10 may further comprise a coupler 68 that is attached to the housing body 16 and that is configured to be operatively attached to an article 14. As an example, the coupler 68 may comprise a double-sided adhesive, such as a double-sided foam tape. Additionally or alternatively, the coupler 68 may comprise a magnet.

Turning now to FIGS. 2-17, illustrative non-exclusive examples of housings 10 configured for use with tracking devices 12 in the form of Apple AirTag™ devices are illustrated. Where appropriate, the reference numerals from the schematic illustration of FIG. 1 are used to designate corresponding parts of the housings of FIGS. 2-17; however, the examples of FIGS. 2-17 are non-exclusive and do not limit housings 10 to the illustrated embodiments of FIGS. 2-17. That is, housings 10 may incorporate any number of the various aspects, configurations, characteristics, properties, etc. of housings 10 that are illustrated in and discussed with reference to the schematic representations of FIG. 1 and/or the embodiments of FIGS. 2-17, as well as variations thereof, without requiring the inclusion of all such aspects, configurations, characteristics, properties, etc. For the purpose of brevity, each previously discussed component, part, portion, aspect, region, etc., or variants thereof may not be discussed, illustrated, and/or labeled again with respect to the embodiments of FIGS. 2-17.

Figures 2, 3, 4:
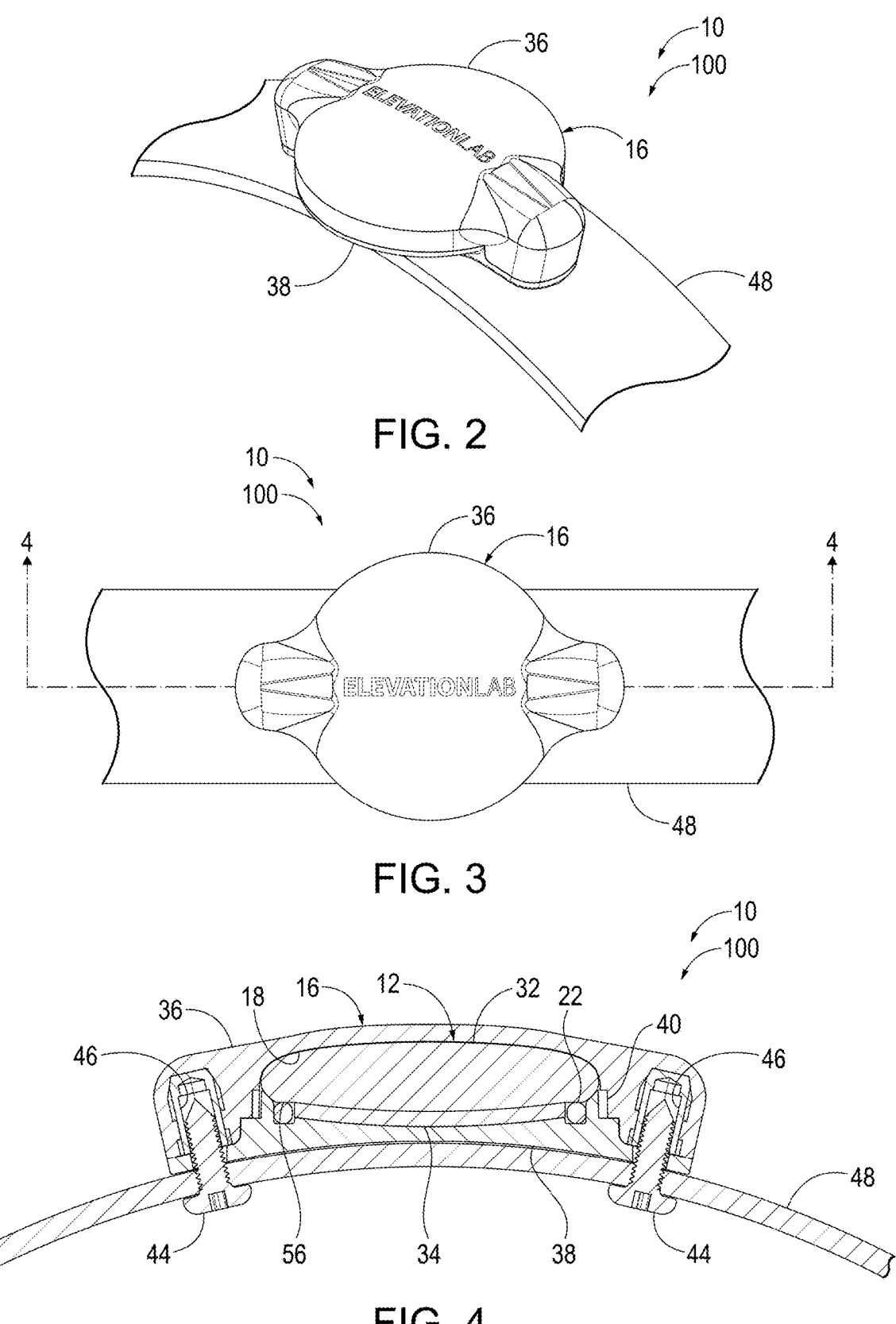
FIG. 2 is an isometric view of an example housing according to the present disclosure, shown secured to a pet collar.
FIG. 3 is a front view of the example housing and pet collar of FIG. 2.
FIG. 4 is a cross-sectional view of the example housing of FIG. 2 with an Apple AirTag™ device, taken along line 4-4 in FIG. 3.

FIGS. 2-4 illustrate example housing 100 operatively secured to a flat flexible material 48 in the form of a pet collar. In particular, as seen in FIG. 4, housing 100 is an example of a housing 10 whose housing body 16 comprises a first body portion 36 and a second body portion 38 and that comprises two fasteners 44 that are configured to pierce the flat flexible material 48 and to operatively coupled together the first body portion 36 and the second body portion 38. Moreover, the first body portion 36 and the second body portion 38 collectively define thread structure 40. In particular the thread structure 40 of assembly 100 has a quarter-turn configuration. Accordingly, when the two fasteners 44 extend through the flat flexible material 48 and are operatively received in the fastener bores 46 of the housing body 16, as depicted in FIG. 4, the fasteners not only secure the housing 100 to the flat flexible material 48, but also prevent the internal volume 18 from being accessed.

As seen in FIG. 4, the Apple AirTag device has a circular planar surface 56 extending around the device cover 34 (i.e., the battery cover of the Apple AirTag™ device). The seal 22, which is in the form of an O-ring, engages the circular planar surface 56 and extends around the battery cover of the Apple AirTag™ device. As a result of the placement of the seal 22, moisture may be able to ingress into the internal volume 18 of the housing body 16 from the interface between the first body portion 36 and the second body portion 38; however, the seal 22 will restrict any such moisture from traveling to the battery compartment of the Apple AirTag™ device.

Figures 5, 6:
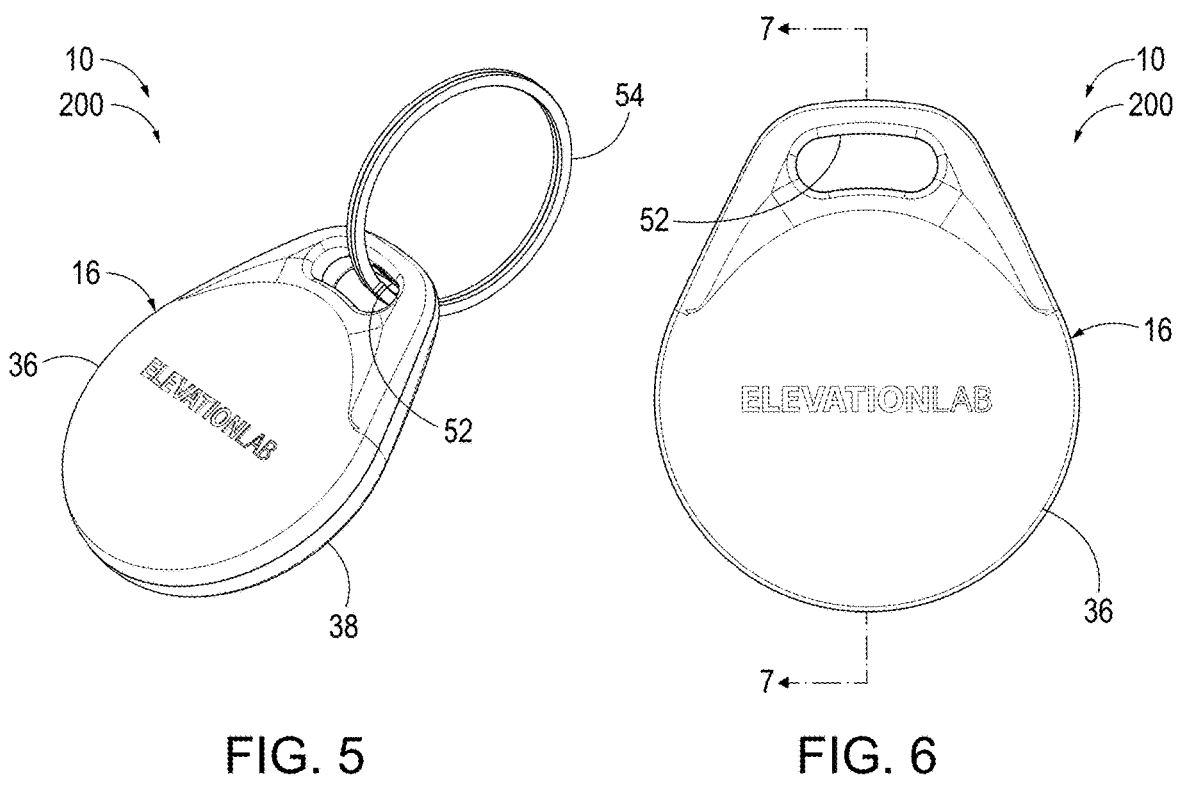
FIG. 5 is an isometric view of another example housing according to the present disclosure, shown secured to a key ring.
FIG. 6 is a front view of the example housing of FIG. 5.
Figure 7:
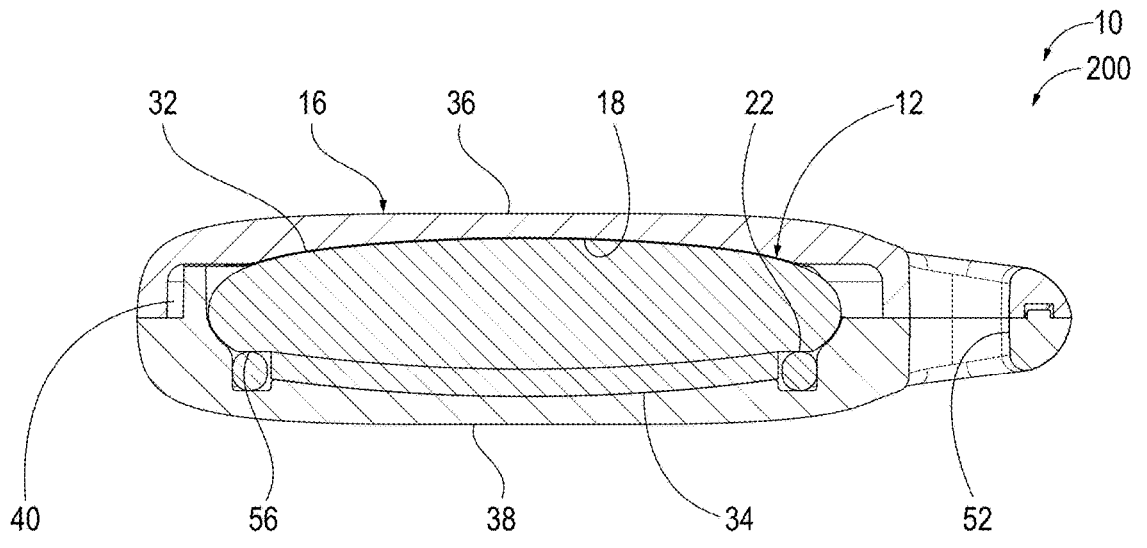
FIG. 7 is a cross-sectional view of the example housing of FIG. 5 with an Apple AirTag™ device, taken along line 7-7 in FIG. 6.
Figure 8:
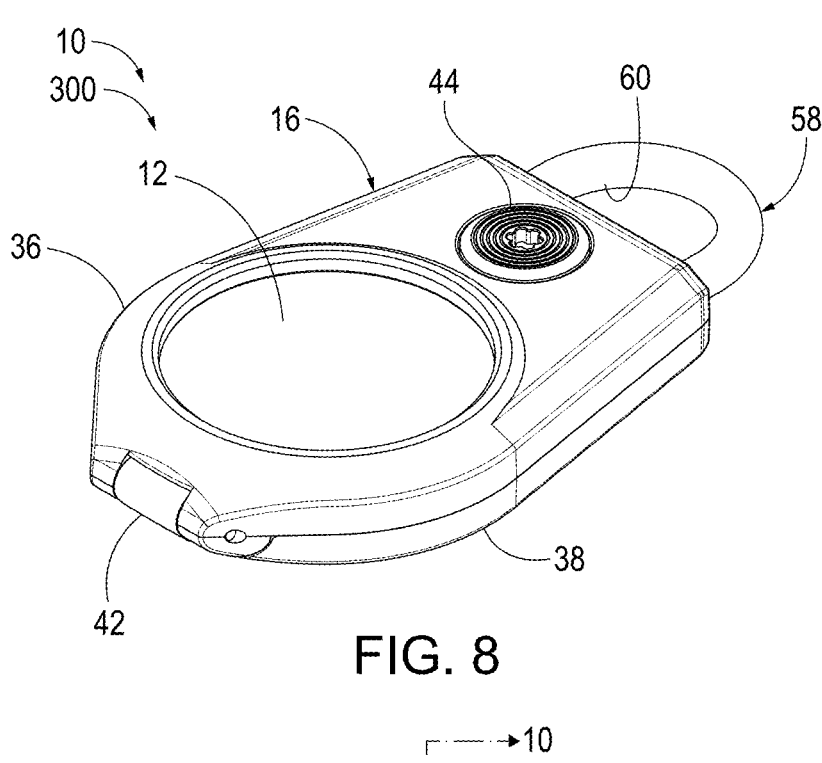
FIG. 8 is an isometric view of another example housing according to the present disclosure with an Apple AirTag™ device.
Figure 9:
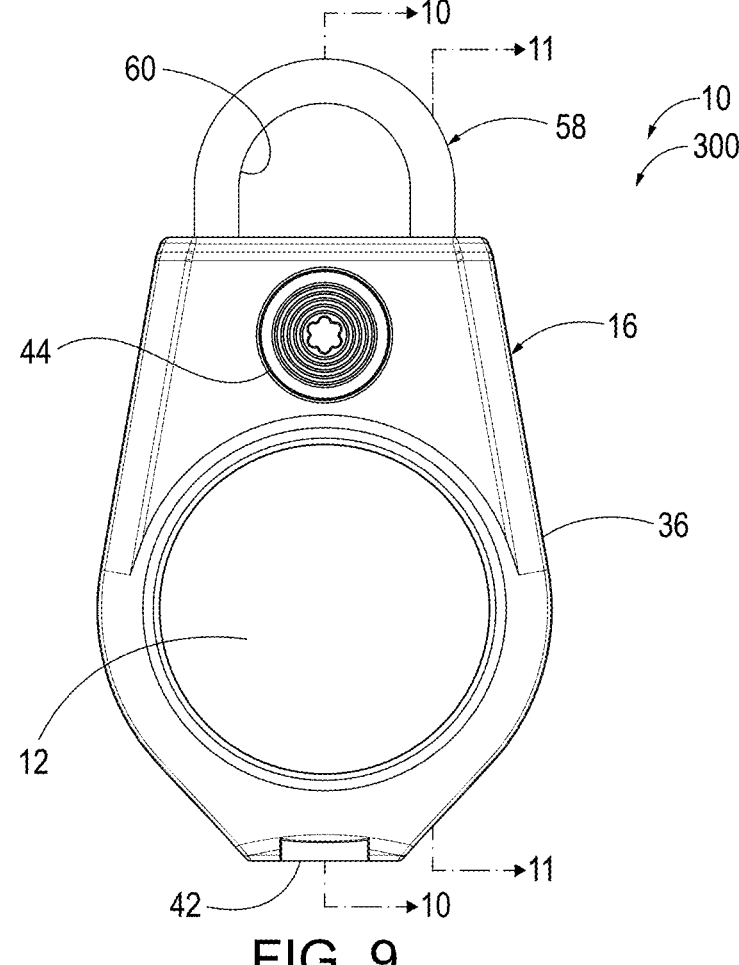
FIG. 9 is a front view of the example housing and Apple AirTag™ device of FIG. 8.

FIGS. 5-7 illustrate example housing 200. Housing 200 is configured for use with an article 14, such as a key ring 54, as seen in FIG. 5. Housing 200 is an example of a housing 10 that comprises a first body portion 36 and a second body portion 38 that collectively define a through-hole 52 and thread structure 40 having a quarter-turn configuration. The through-hole 52 is sized such that when an article 14, such as a key ring 54, extends through the through-hole 52, the thread structure 40 will not fully disengage to permit access to the internal volume 18. Accordingly, the key ring 54 will have to be removed from the through-hole 52 for full access to the internal volume 18, and thus for placement and removal of an Apple AirTag™ device.

As best seen in FIG. 7, as with housing 100, the seal 22 of housing 200 is in the form of an O-ring that engages the circular planar surface 56, and that extends around the battery cover of, the Apple AirTag™ device.

Figure 10:
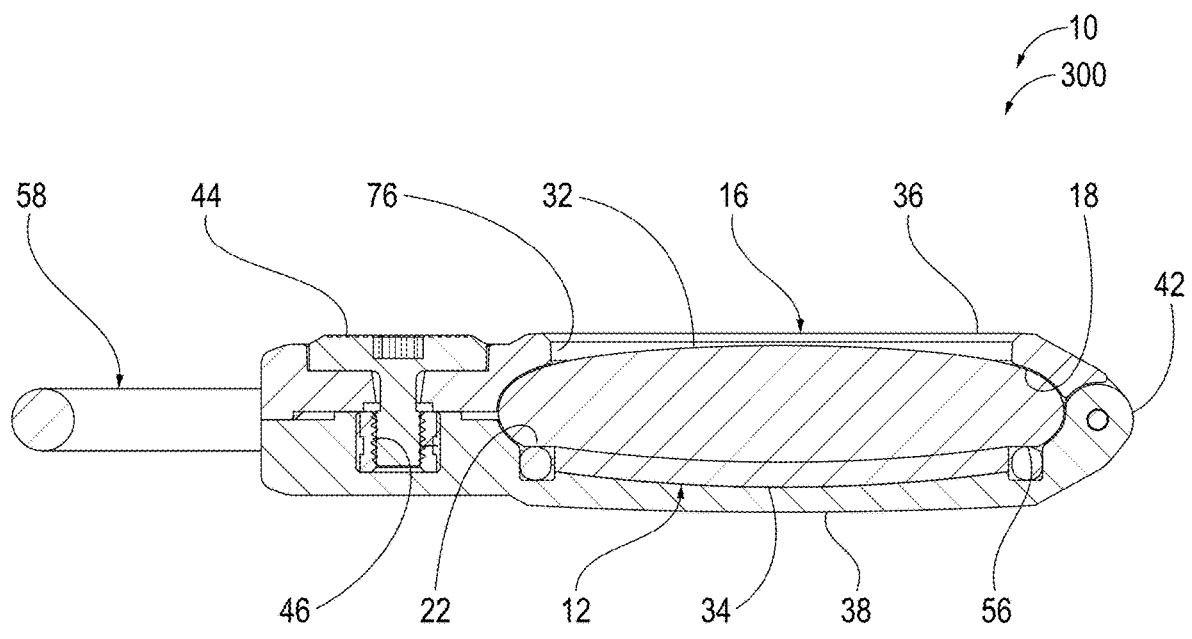
FIG. 10 is a cross-sectional view of the example housing and Apple AirTag™ device of FIG. 8, taken along line 10-10 in FIG. 9.
Figure 11:
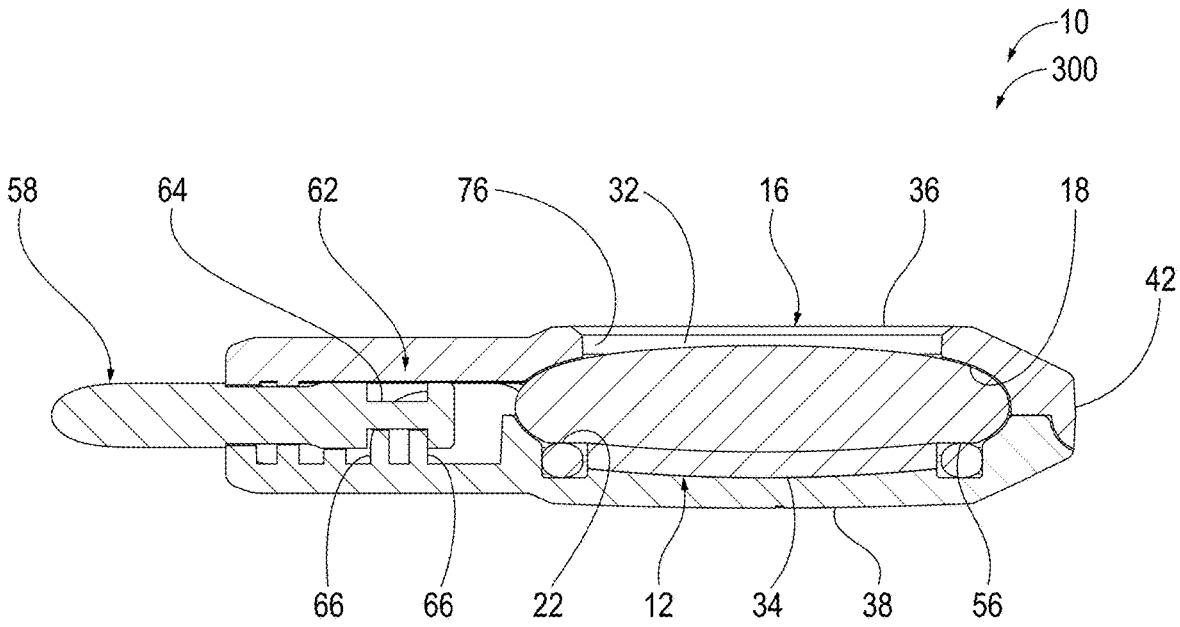
FIG. 11 is a cross-sectional view of the example housing and Apple AirTag™ device of FIG. 8, taken along line 11-11 in FIG. 9.
Figures 12, 13:
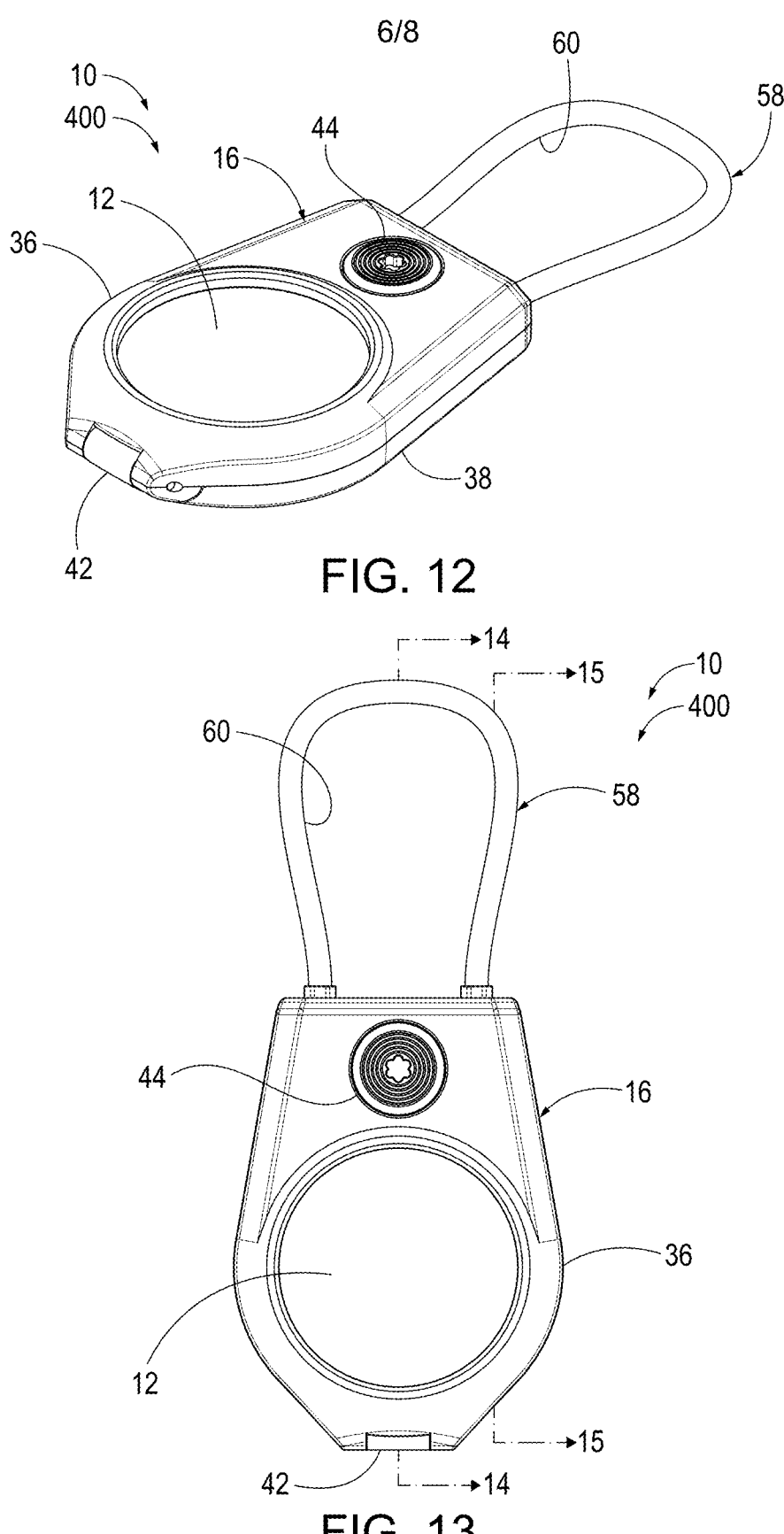
FIG. 12 is an isometric view of another example housing according to the present disclosure with an Apple AirTag™ device.
FIG. 13 is a front view of the example housing and Apple AirTag™ device of FIG. 12.
Figure 14:
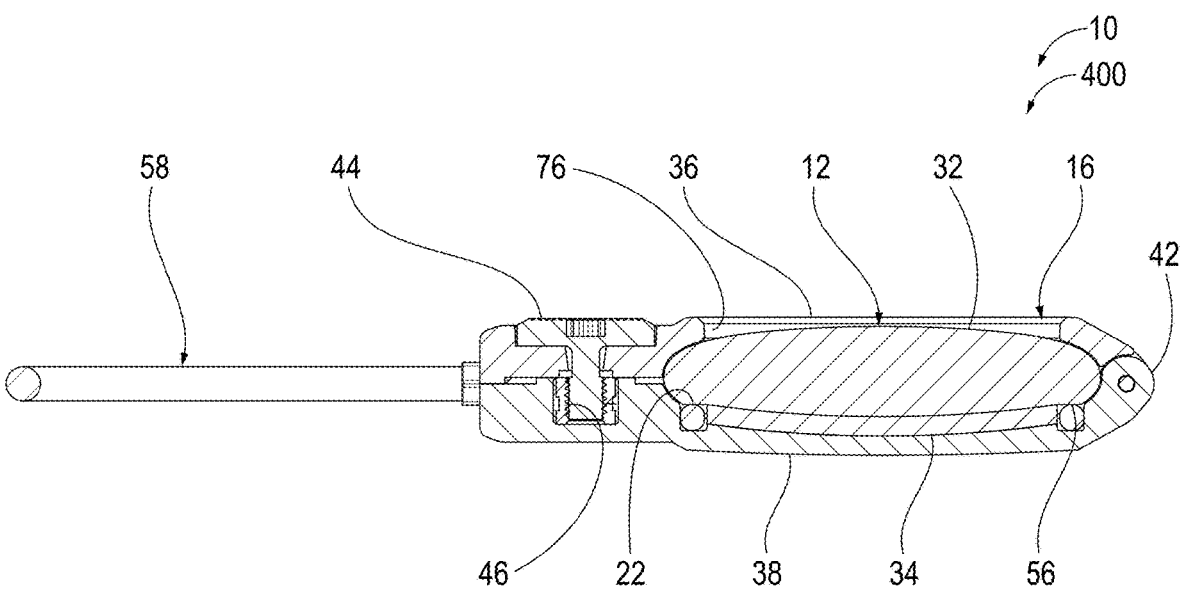
FIG. 14 is a cross-sectional view of the example housing and Apple AirTag™ device of FIG. 12, taken along line 14-14 in FIG. 13.
Figure 15:
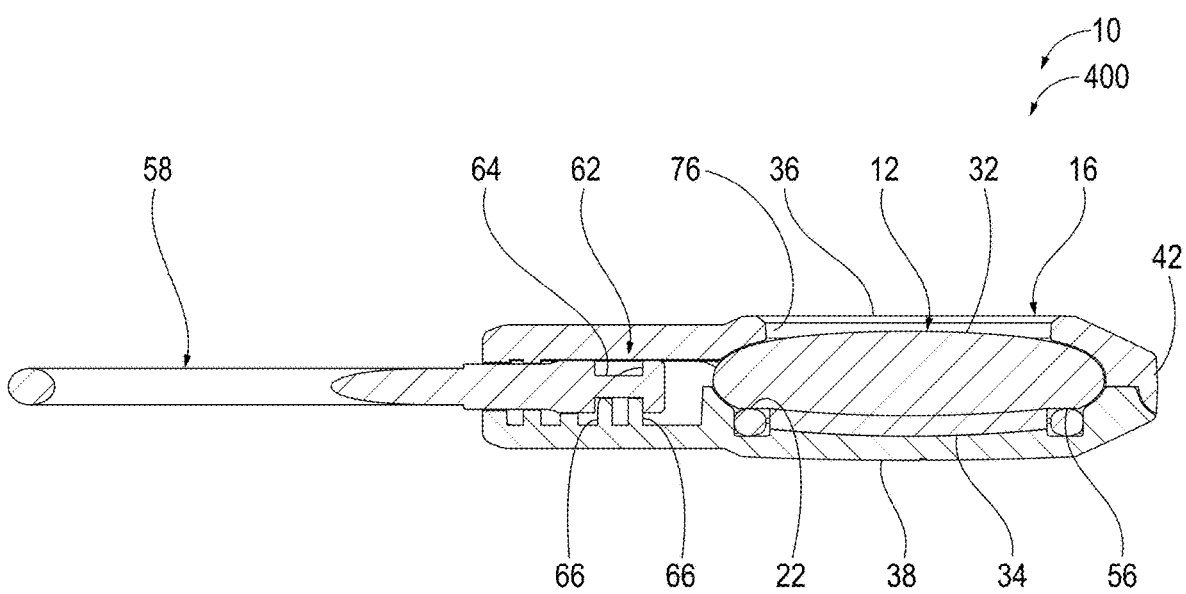
FIG. 15 is a cross-sectional view of the example housing and Apple AirTag™ device of FIG. 12, taken along line 15-15 in FIG. 13.

FIGS. 8-11 illustrate example housing 300. Housing 300 is an example of a housing 10 that comprises a first body portion 36 and a second body portion 38 that collectively define a hinge 42. Housing 300 comprises a single fastener 44, which, as best seen in FIG. 10, maintains the housing body 16 in a closed configuration to restrict removal of the Apple AirTag™ device.

As best seen in the FIG. 10, as with housing 100, the seal 22 of housing 300 is in the form of an O-ring that engages the circular planar surface 56 and extends around the battery cover of the Apple AirTag™ device.

Housing 300 is an example of a housing 10 that also comprises a rigid elongate retainer 58 that extends from the housing body 16. In particular, with reference to FIG. 11, the elongate retainer 58 of housing 300 comprises end regions 62 that each define a circumferential channel 64, and the second body portion 38 comprises protrusions 66 that extend into each circumferential channel 64 when the first body portion 36 and the second body portion 38 are hinged closed. Accordingly, when the fastener 44 operatively maintains the first body portion 36 and the second body portion 38 in a closed configuration, the rigid elongate retainer 58 is restricted from being removed from the housing body 16.

The first body portion 36 of the housing body 16 of housing 300 defines a window 76 that provides visual and physical access to the Apple AirTag™ device, but which restricts removal of the Apple AirTag™ device via the window 76.

FIGS. 12-15 illustrate example housing 400. Housing 400 is constructed identically to housing 300, but for inclusion of an elongate retainer 58 that is flexible and longer than the rigid elongate retainer of housing 300.

Figure 16:
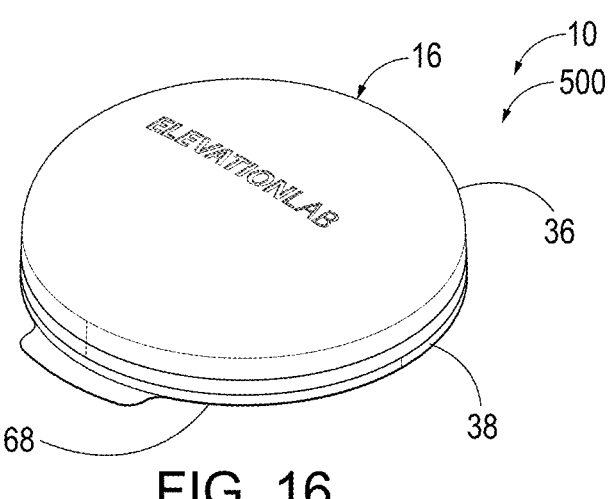
FIG. 16 is an isometric view of another example housing according to the present disclosure.
Figure 17:
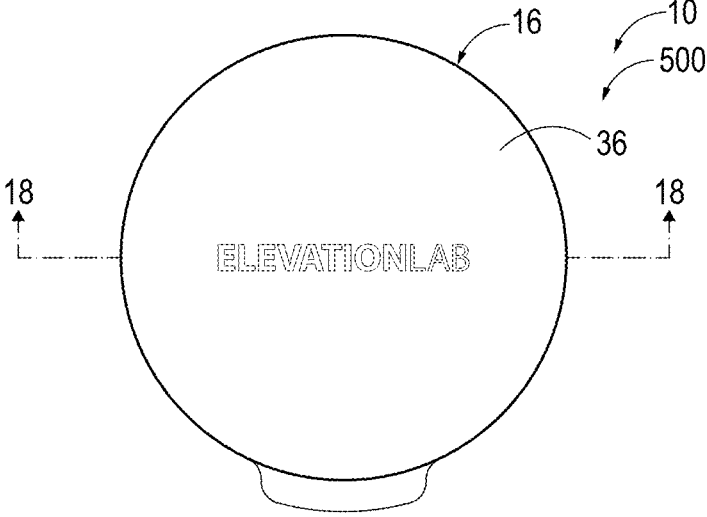
FIG. 17 is a front view of the example housing of FIG. 16.
Figure 18:
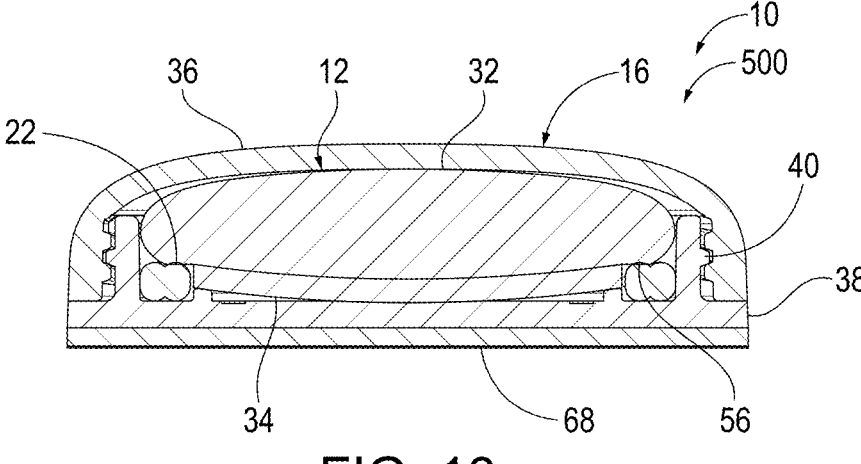
FIG. 18 is a cross-sectional view of the example housing of FIG. 16 with an Apple AirTag™ device, taken along line 18-18 in FIG. 17.

FIGS. 16-18 illustrate example housing 500. Housing 500 is an example of a housing 10 that comprises a first body portion 36 and a second body portion 38 that are threadingly coupled together via thread structure 40. Housing 500 comprises a coupler 68 in the form of a double-sided foam tape. As seen in the FIG. 18, as with housing 100, the seal 22 of housing 500 is in the form of an O-ring that engages the circular planar surface 56 and extends around the battery cover of the Apple AirTag™ device.

Illustrative, non-exclusive examples of inventive subject matter according to the present disclosure are described in the following enumerated paragraphs:

A. A housing (10) for a tracking device (12), the housing (10) comprising:

a housing body (16) having an internal volume (18) configured to selectively receive and retain the tracking device (12) in a close-fit relationship, wherein the internal volume (18) has a width (20) and a height (21); and a seal (22) positioned within the internal volume (18) or configured to be positioned within the internal volume (18) to engage both the housing body (16) and the tracking device (12) when the tracking device (12) is operatively received in the internal volume (18), wherein the seal (22) has an outermost seal dimension (24) that is less than the width (20) of the internal volume (18);

wherein the housing (10) is configured to be secured to an article (14).

A1. The housing (10) of paragraph A, wherein the seal (22) has an enclosed shape.

A2. The housing (10) of any of paragraphs A-A1, wherein the seal (22) is fixed to the housing body (16).

A2.1. The housing (10) of paragraph A2, wherein the seal (22) is adhered to the housing body (16).

A2.2. The housing (10) of any of paragraphs A2-A2.1, wherein the seal (22) is overmolded to the housing body (16).

A3. The housing (10) of any of paragraphs A-A2.2, wherein the seal (22) is an O-ring or a gasket.

A4. The housing (10) of any of paragraphs A-A3, wherein the tracking device (12) is an Apple AirTag™ device.

A5. The housing (10) of any of paragraphs A-A4, wherein the seal (22) is positioned within the internal volume (18) or is configured to be positioned within the internal volume (18) to protect less than an entirety of the tracking device (12) from environment external to the housing (10) when the tracking device (12) is operatively received in the internal volume (18).

A6. The housing (10) of any of paragraphs A-A5, wherein the tracking device (12) defines a battery compartment (26) and a device opening (28) to the battery compartment (26);

wherein the device opening (28) has an outermost opening dimension (30) that is less than the outermost seal dimension (24); and wherein the seal (22) extends around the device opening (28) when the tracking device (12) is operatively received within the internal volume (18).

A6.1. The housing (10) of paragraph A6, wherein the tracking device (12) comprises a device body (32) and a device cover (34) removably coupled to the device body (32) to close the device opening (28);

wherein the device body (32) defines the device opening (28);

wherein the seal (22) engages the device body (32) around the device cover (34) when the tracking device (12) is operatively received within the internal volume (18).

A6.1.1. The housing (10) of paragraph A6.1, wherein the seal (22) further engages the device cover (34) when the tracking device (12) is operatively received within the internal volume (18).

A6.1.2. The housing (10) of any of paragraphs A6.1-A6.1.1, wherein the device body (32) comprises a circular planar surface (56) extending around the device opening (28); and wherein the seal (22) engages the circular planar surface (56) when the tracking device (12) is operatively received within the internal volume (18).

A7. The housing (10) of any of paragraphs A-A6.1.2, further comprising the tracking device (12).

A7.1. The housing (10) of paragraph A7, wherein the tracking device (12) is operatively received in the internal volume (18).

A8. The housing (10) of any of paragraphs A-A7.1, wherein the housing body (16) comprises a first body portion (36) and a second body portion (38) that collectively define the internal volume (18).

A8.1. The housing (10) of paragraph A8, wherein the second body portion (38) is removably coupled to the first body portion (36) to permit placement and removal of the tracking device (12) in and from the internal volume (18).

A8.1.1. The housing (10) of paragraph A8.1, wherein the first body portion (36) and the second body portion (38) collectively define a thread structure (40).

A8.1.1.1. The housing (10) of paragraph A8.1, wherein the thread structure (40) is configured to require less than 180-degrees of rotation of the first body portion (36) relative to the second body portion (38) for operatively coupling and decoupling of the first body portion (36) and the second body portion (38).

A8.1.2. The housing (10) of paragraph A8.1, wherein the first body portion (36) and the second body portion (38) have a snap-fit arrangement or a friction-fit arrangement.

A8.2. The housing (10) of paragraph A8, wherein the housing body (16) comprises a hinge (42), and wherein second body portion (38) is hinged to the first body portion (36).

A8.3. The housing (10) of any of paragraphs A8-A8.2, wherein the seal (22) engages only one of the first body portion (36) or the second body portion (38) when the first body portion (36) and the second body portion (38) are operatively coupled together.

A9. The housing (10) of any of paragraphs A-A8.3, wherein the article (14) is a flat flexible material (48).

A9.1. The housing (10) of paragraph A9, further comprising:

at least one fastener (44) configured to extend through the flat flexible material (48);

wherein the housing body (16) defines at least one fastener bore (46) configured to operatively receive the at least one fastener (44).

A9.1.1. The housing (10) of paragraph A9.1, wherein the at least one fastener (44) is configured to pierce the flat flexible material (48).

A9.1.2. The housing (10) of any of paragraphs A9.1-A9.1.1, further comprising:

a backing plate (50) configured to be positioned opposite the housing body (16) relative to the flat flexible material (48);

wherein the at least one fastener (44) is configured to extend through the backing plate (50).

A9.1.3. The housing (10) of any of paragraphs A9.1-A9.1.2 when depending from paragraph A8, wherein the at least one fastener bore (46) extends into the first body portion (36) and the second body portion (38); and wherein, when the at least one fastener (44) extends through the flat flexible material (48) and is operatively received in the at least one fastener bore (46), the at least one fastener (44) serves to secure the housing (10) to the flat flexible material (48) and to couple the first body portion (36) to the second body portion (38) to restrict access to the internal volume (18).

A9.1.4. The housing (10) of any of paragraphs A9.1-A9.1.3, wherein the at least one fastener (44) comprises two fasteners (44).

A10. The housing (10) of any of paragraphs A-A9.1.4, wherein the housing body (16) defines a through-hole (52) configured to receive at least a portion of the article (14).

A10.1. The housing (10) of paragraph A10, wherein the article (14) is a key ring (54).

A10.1.1. The housing (10) of paragraph A10.1, further comprising the key ring (54).

A10.1.1.1. The housing (10) of paragraph A10.1.1, wherein the key ring (54) extends through the through-hole (52).

A10.2. The housing (10) of any of paragraphs A10-A10.1.1.1 when depending from paragraph A8, wherein the through-hole (52) extends through the first body portion (36) and the second body portion (38); and wherein, when the article (14) operatively extends through the through-hole (52), the internal volume (18) is restricted from being fully accessed to receive the tracking device (12) in the internal volume (18) or to release the tracking device (12) from the internal volume (18).

A10.2.1. The housing (10) of paragraph A10.2 when depending from paragraph A8.1.1, wherein, when the article (14) operatively extends through the through-hole (52), the article (14) restricts the thread structure (40) from fully separating the first body portion (36) from the second body portion (38).

A11. The housing (10) of any of paragraphs A-A10.2.1, further comprising:

an elongate retainer (58) extending from the housing body (16), wherein the elongate retainer (58) and the housing body (16) collectively define a passage (60) configured to receive at least a portion of the article (14).

A11.1. The housing (10) of paragraph A11, wherein the elongate retainer (58) is removably coupled to the housing body (16).

A11.2. The housing (10) of any of paragraphs A11-A11.1, wherein the elongate retainer (58) is rigid.

A11.3. The housing (10) of any of paragraphs A11-A11.1, wherein the elongate retainer (58) is flexible.

A11.4. The housing (10) of any of paragraphs A11-A11.3, wherein the elongate retainer (58) comprises end regions (62) positioned within the housing body (16); and wherein the housing body (16) is configured to restrict removal of the end regions (62) from within the housing body (16).

A11.4.1. The housing (10) of paragraph A11.4, wherein each end region (62) of the end regions (62) defines a circumferential channel (64); and wherein the housing body (16) comprises a protrusion (66) that extends into each circumferential channel (64).

A11.4.1.1. The housing (10) of paragraph A11.4.1 when depending from paragraph A8, wherein the first body portion (36) and the second body portion (38) collectively define the protrusion (66) that extends into each circumferential channel (64);

wherein, when the first body portion (36) and the second body portion (38) are operatively coupled together, the end regions (62) are restricted from being removed from the housing body (16); and wherein, when the first body portion (36) and the second body portion (38) are operatively separated, the end regions (62) are permitted to be removed from the housing body (16).

A12. The housing (10) of any of paragraphs A-A11.4.1.1, further comprising:

a coupler (68) attached to the housing body (16) and configured to be operatively attached to the article (14).

A12.1. The housing (10) of paragraph A12, wherein the coupler (68) comprises a double-sided adhesive.

A12.2. The housing (10) of any of paragraphs A12-A12.1, wherein the coupler (68) comprises a double-sided foam tape.

A12.3. The housing (10) of any of paragraphs A12-A12.2, wherein the coupler (68) comprises a magnet.

A13. The housing (10) of any of paragraphs A-A12.3, wherein the housing (10) defines a central axis (70), and wherein the housing (10) is substantially radially symmetrical about the central axis (70).

B. A housing (10) for a tracking device (12), the housing (10) comprising:

a housing body (16) having an internal volume (18) configured to selectively receive and retain the tracking device (12); and an elongate retainer (58) extending from the housing body (16), wherein the elongate retainer (58) and the housing body (16) collectively define a passage (60) configured to receive at least a portion of an article (14), and wherein the elongate retainer (58) is rigid.

B1. The housing (10) of paragraph B, wherein the elongate retainer (58) is removably coupled to the housing body (16).

B2. The housing (10) of any of paragraphs B-B1, wherein the elongate retainer (58) comprises end regions (62) positioned within the housing body (16); and wherein the housing body (16) is configured to restrict removal of the end regions (62) from within the housing body (16).

B2.1. The housing (10) of paragraph B2, wherein each end region (62) of the end regions (62) defines a circumferential channel (64); and wherein the housing body (16) comprises a protrusion (66) that extends into each circumferential channel (64).

B2.1.1. The housing (10) of paragraph B2.1, wherein the housing body (16) comprises a first body portion (36) and a second body portion (38) that collectively define the internal volume (18);

wherein the first body portion (36) and the second body portion (38) collectively define the protrusion (66) that extends into each circumferential channel (64);

wherein, when the first body portion (36) and the second body portion (38) are operatively coupled together, the end regions (62) are restricted from being removed from the housing body (16); and wherein, when the first body portion (36) and the second body portion (38) are operatively separated, at least one of the end regions (62) is permitted to be removed from the housing body (16).

B3. The housing (10) of any of paragraphs B-B2.1.1, further comprising the subject matter of any of paragraphs A-A13.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A housing (10) for a tracking device (12), the housing (10) comprising:

a housing body (16) having an internal volume (18) configured to selectively receive and retain the tracking device (12); and an elongate retainer (58) extending from the housing body (16), wherein the elongate retainer (58) and the housing body (16) collectively define a passage (60) configured to receive at least a portion of an article (14), wherein the elongate retainer (58) is rigid, and wherein the elongate retainer (58) comprises end regions (62) positioned within the housing body (16);

wherein the housing body (16) is configured to restrict removal of the end regions (62) from within the housing body (16).

2. The housing (10) of claim 1, wherein the elongate retainer (58) is removably coupled to the housing body (16).

3. The housing (10) of claim 1, wherein each end region (62) of the end regions (62) defines a circumferential channel (64); and wherein the housing body (16) comprises a protrusion (66) that extends into each circumferential channel (64).

4. The housing (10) of claim 3, wherein the housing body (16) comprises a first body portion (36) and a second body portion (38) that collectively define the internal volume (18);

wherein the first body portion (36) and the second body portion (38) collectively define the protrusion (66) that extends into each circumferential channel (64);

wherein, when the first body portion (36) and the second body portion (38) are operatively coupled together, the end regions (62) are restricted from being removed from the housing body (16); and wherein, when the first body portion (36) and the second body portion (38) are operatively separated, at least one of the end regions (62) is permitted to be removed from the housing body (16).

5. The housing (10) of claim 1, wherein the internal volume (18) is configured to selectively receive and retain the tracking device (12) in a close-fit relationship, wherein the internal volume (18) has a width (20) and a height (21); and wherein the housing (10) further comprises a seal (22) positioned within the internal volume (18).

6. The housing (10) of claim 5, wherein the seal (22) has an outermost seal dimension (24) that is less than the width (20) of the internal volume (18).

7. The housing (10) of claim 5, wherein the seal (22) has an enclosed shape.

8. The housing (10) of claim 5, wherein the seal (22) is positioned within the internal volume (18) to protect less than an entirety of the tracking device (12) from environment external to the housing (10) when the tracking device (12) is operatively received in the internal volume (18).

9. The housing (10) of claim 5, wherein the seal (22) has an outermost seal dimension (24);

wherein the tracking device (12) defines a battery compartment (26) and a device opening (28) to the battery compartment (26);

wherein the device opening (28) has an outermost opening dimension (30) that is less than the outermost seal dimension (24); and wherein the seal (22) extends around the device opening (28) when the tracking device (12) is operatively received within the internal volume (18).

10. The housing (10) of claim 9, wherein the tracking device (12) comprises a device body (32) and a device cover (34) removably coupled to the device body (32) to close the device opening (28);

wherein the device body (32) defines the device opening (28);

wherein the seal (22) engages the device body (32) around the device cover (34) when the tracking device (12) is operatively received within the internal volume (18).

11. The housing (10) of claim 10, wherein the seal (22) further engages the device cover (34) when the tracking device (12) is operatively received within the internal volume (18).

12. The housing (10) of claim 10, wherein the device body (32) comprises a circular planar surface (56) extending around the device opening (28); and wherein the seal (22) engages the circular planar surface (56) when the tracking device (12) is operatively received within the internal volume (18).

13. The housing (10) of claim 1, wherein the housing body (16) comprises a first body portion (36) and a second body portion (38) that collectively define the internal volume (18).

14. The housing (10) of claim 13, wherein the second body portion (38) is removably coupled to the first body portion (36) to permit placement and removal of the tracking device (12) in and from the internal volume (18).

15. The housing (10) of claim 13, wherein the housing body (16) comprises a hinge (42), and wherein second body portion (38) is hinged to the first body portion (36).

16. The housing (10) of claim 15, wherein the housing first body portion (36) and the second body portion (38) collectively define a fastener bore (46); and wherein the housing (10) further comprises a fastener (44) that extends into the fastener bore (46) to restrict the first body portion (36) and the second body portion (38) from being hinged apart and thus to restrict removal of the tracking device (12) when the tracking device (12) is operatively received in the internal volume (18).

17. The housing (10) of claim 13, wherein the housing (10) further comprises a seal (22) positioned within the internal volume (18), and wherein the seal (22) engages only one of the first body portion (36) or the second body portion (38) when the first body portion (36) and the second body portion (38) are operatively coupled together.

* * * * *